(12) United States Patent
Arvidsson et al.

(10) Patent No.: US 8,972,568 B2
(45) Date of Patent: Mar. 3, 2015

(54) QUANTIFYING USER QUALITY OF EXPERIENCE BY PASSIVE MONITORING

(75) Inventors: Åke Arvidsson, Solna (SE); Neda Beheshti, San Jose, CA (US); Ying Zhang, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 649 days.

(21) Appl. No.: 13/401,645

(22) Filed: Feb. 21, 2012

(65) Prior Publication Data

US 2013/0219048 A1 Aug. 22, 2013

(51) Int. Cl.
*G06F 15/173* (2006.01)
*H04L 12/24* (2006.01)
*G06F 15/16* (2006.01)

(52) U.S. Cl.
CPC ........ *H04L 41/5025* (2013.01); *H04L 41/5067* (2013.01)
USPC ............................ 709/224; 709/227; 709/231

(58) Field of Classification Search
CPC ..... H04L 41/5067; H04L 67/02; H04L 12/14; H04L 41/5025; H04L 67/322; H04L 43/16; G06F 17/30902; G06Q 30/00
USPC ......................................... 709/224, 227, 231
See application file for complete search history.

(56) References Cited

U.S. PATENT DOCUMENTS

| | | | | |
|---|---|---|---|---|
| 7,639,613 B1 * | 12/2009 | Ghannadian et al. | .......... | 370/232 |
| 2002/0013849 A1 * | 1/2002 | Schweitzer et al. | .......... | 709/227 |
| 2003/0223422 A1 * | 12/2003 | Igarashi et al. | .............. | 370/390 |
| 2005/0076111 A1 * | 4/2005 | Cherkasova et al. | .......... | 709/224 |
| 2007/0025301 A1 * | 2/2007 | Petersson et al. | ............. | 370/338 |
| 2007/0183378 A1 * | 8/2007 | Passarella et al. | ............ | 370/338 |
| 2008/0205273 A1 * | 8/2008 | Wackerly | ....................... | 370/235 |
| 2009/0103478 A1 * | 4/2009 | Sammour et al. | ............. | 370/328 |
| 2009/0310494 A1 * | 12/2009 | Ou et al. | ....................... | 370/252 |
| 2011/0222412 A1 * | 9/2011 | Kompella | .................. | 370/241.1 |
| 2011/0283011 A1 * | 11/2011 | Li et al. | .......................... | 709/231 |
| 2012/0140633 A1 * | 6/2012 | Stanwood et al. | ............ | 370/235 |

OTHER PUBLICATIONS

ITU-T Recommendation, "P.800. Methods for subjective determination of transmission quality," *International Telecommunication Union*, 1996. 37 pages.

"J. 144. Objective perceptual video quality measurement techniques for digital cable television in the presence of a full reference," *International Telecommunication Union*, 2001.

S. Wolf and M.H. Pinson, "Spatial-temporal distortion metrics for inservice quality monitoring of any digital video system," in *Proc. SPIE*, vol. 3845, pp. 266-277, 1999., 12 pages.

(Continued)

*Primary Examiner* — David Lazaro
*Assistant Examiner* — Vitali Korobov
(74) *Attorney, Agent, or Firm* — Blakely, Sokoloff, Taylor & Zafman, LLP

(57) ABSTRACT

A method is implemented in a network element to generate quality of experience (QoE) metrics for hypertext transfer protocol (HTTP) sessions over a network between a user device and an HTTP server. The QoE metrics are based on detecting premature termination of a download process that indicate low QoE. This QoE metric data can then be utilized by network administrators or service providers to adjust network characteristics to improve the QoE or to offer changes in services to a customer that would improve the QoE.

20 Claims, 10 Drawing Sheets

(56) References Cited

OTHER PUBLICATIONS

Z. Wang, L. Lu and A.C. Bovik, "Video Quality Assessment on Structural Distortion Measurement", *Signal Processing: Image Communication*, 19 (2), 121-132, 2004., 9 pages.

J. Beerends, A. Hekstra, A. Rix and M. Hollier Perceptual Evaluation of Speech Quality (PESQ), the new ITU standard for end-to-end speech quality assessment. Part II, Psychoacoustic model, 1998, 27 pages.

S. Voran, "*the Development of Objective Video Quality Measures that Emulate Human Perception*," *IEEE GLOBECOM*, 1776-1781, 1991, 6 pages, Wonho Yang and Robert Yantorno Enhanced modified bark spectral distortion (EMBSD): an objective speech quality measure based on audible distortion and cognition model, 1999.

Andrzej Glowacz, Michal Grega, Przemyslaw Gwiazda, Lucian Janowski, Mikolaj Leszczuk, Piotr Romaniak, Simon Pietro Romano: Automated qualitative assessment of multi-modal disroerions in digital images based on GLZ. *Annales des Telecommunications* 65 (1-2).

K. T. Chen, P. Huang, and C. L. Lei, "How sensitive are online gamers to network quality?" *Communications of the ACM*, vol. 49, No. 11, pp. 34-38, Nov. 2006.

International Telecommunication Union, "The E-Model, A Computational Model for Use in Transmission Planning", rec. ITU-T G. 107, 2005, 28 pages.

S. Mohamed and G Rubino, "A Study of Real-Time Packet Video Quality Using Random Neural Networks," *IEEE Trans. on Circuits and Systems for Video Technology*, 12, 1071-1083, 2002, 13 pages.

K. T. Chen C. Y. Huan. P. Huan. and C.L. Lei "Quantifying Skype user satisfaction," in *Proceedings of ACM SIGCOMM 2006*, Pisa, Italy, Sep. 2006, 12 pages.

K.T. Chen, C.C. Tu and W. C. Xiao, "OneClick: A framework for measuring network quality of experience," in *Proceedings of IEEE INFOCOM 2009*, 9 pages.

S. Khirman and P. Henriksen, Relationship between Quality-of-Service and Qualaity-of-Experience for public Internet service, in *Proc. 3rd Passive Active Measurement Workshop*, Fort Collins (2002), 6 pages.

Quittek, J., et al., "Requirements for IP Flow Information Export", draft-ietf-ipfix-reqs-16.txt; vol. ipfix, No. 16; Jun. 1, 2004; Sections 2-6.

* cited by examiner

QUANTIFYING USER QUALITY OF EXPERIENCE BY PASSIVE MONITORING

FIELD

The embodiments of the invention relate to a method and system for passive monitoring of data traffic to determine a Quality of Experience metric. Specifically, the embodiments relate to a method and system for monitoring data traffic related to web site usage for determining a QoE metric.

BACKGROUND

The service requirements of network applications have shifted from high throughput to high media quality, interactivity, and responsiveness, which can be referred to as QoE (Quality of Experience). QoE is thus application-dependent and multidimensional. Although it may not be difficult to measure individual dimensions of the QoE, how to capture users' overall perceptions when they are using different network applications remains an open question. It is particularly difficult to obtain QoE metrics that do not require direct feedback from the user. Querying users about their experiences or directly monitoring is often too intrusive except under non-real world conditions such as in labs or studies where the participants volunteer or are paid to participate. Therefore QoE metric data can be unavailable in many real-world resource usage cases.

While operators today have ways to monitor and support differentiated Quality of Service (QoS), automated methods to translate QoS to QoE for general applications are limited to a few audio or video streaming applications. In other resource usage cases, QoS metrics have not been translated into QoE metrics. As a result, administrators and service providers are not able to manage networks and resources to improve QoE or to offer services that improve or control QoE.

SUMMARY

A method is implemented in a network element to generate quality of experience (QoE) metrics for hypertext transfer protocol (HTTP) sessions over a network between a user device and an HTTP server. The QoE metrics are based on detecting premature termination of a download process that indicates low QoE. This method compares characteristics of a data flow received at the network element with active HTTP sessions tracked by a QoE module of the network element. In response to a match of the received data flow with a matched active HTTP session, a check is made as to whether a time stamp of a latest packet of the received data flow is within a threshold time since a last packet in the matched active HTTP session. In response to not finding a match of the received data flow in the active HTTP sessions, a check is made as to whether the received data flow is related to one of the active HTTP sessions based on an address of the user device or embedded content identifier of the received data flow. The method groups the received data flow with the matched active HTTP session or a related active HTTP session. A check is made as to whether a premature termination has occurred prior to normal completion for the matched active HTTP session or the related HTTP session. In response to detecting that the premature termination occurred, the method categorizes a download process linked to the matched active HTTP session or the related HTTP session as a prematurely terminated download process.

A network element is configured to execute a set of processes to generate quality of experience (QoE) metrics for hypertext transfer protocol (HTTP) sessions over a network between a user device and an HTTP server. The QoE metrics are based on detecting prematurely terminated download processes that indicate low QoE. The network element includes an ingress module to receive a data flow between the user device and the HTTP server and an egress module to transmit the data flow between the user device and the HTTP server. The network element also includes a network processor to execute a QoE monitor module and to maintain an active HTTP session data store and a download process data store. The active HTTP session data store stores the HTTP session state for each active HTTP session traversing the network element. The download process data store stores the download process state for each download session traversing the network element, where each download process can include a set of related active HTTP sessions. The QoE monitor module compares characteristics of the data flow with active HTTP sessions tracked by the QoE monitor module in the active HTTP session data store. The QoE monitor module checks, in response to a match of the received data flow with a matched active HTTP session, whether a time stamp of a latest packet of the received data flow is within a threshold time since a last packet in the matched active HTTP session. The QoE monitor module also checks whether the received data flow is related to one of the active HTTP sessions based on an address of the user device or embedded content identifier of the received data flow in response to not finding a match of the received data flow in the active HTTP sessions. The QoE monitor module groups the received data flow with the matched active HTTP session or a related active HTTP session. The QoE monitor module checks whether a premature termination has occurred prior to normal completion for the matched active HTTP session or the related HTTP session, and in response to detecting that the premature termination occurred, categorizes a download process linked to the matched active HTTP session or the related HTTP session as a prematurely terminated download process.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
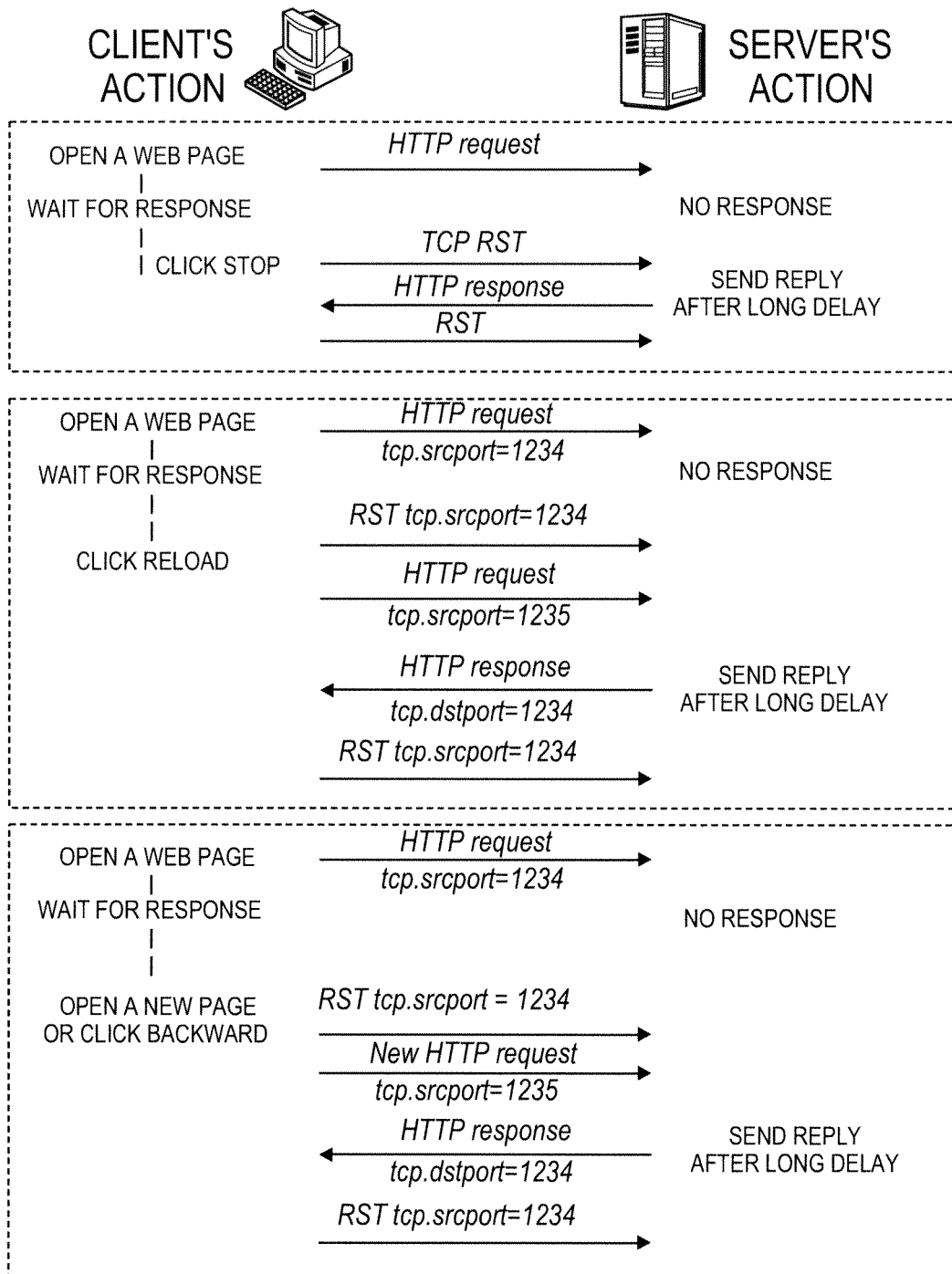
FIG. 1 is a diagram of one example embodiment of web page usage scenarios indicating unsatisfactory user experience.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flowcharts will be described with reference to the exemplary embodiments of diagrams. However, it should be understood that the operations of the flowcharts can be performed by embodiments of the invention other than those discussed with reference to the diagrams, and the embodiments discussed with reference to diagrams can perform operations different than those discussed with reference to the flowcharts.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

The terms "data packets," "data flows" and "HTTP sessions are used herein below to describe different levels of data transmission. As used herein "HTTP sessions" consist of one or more "data flows" and each "data flow" consists of one or more "data packets." Data packets are a unit of data transmission over a network such as a Internet Protocol (IP) data packet or similar data packet.

User Quality of Experience for Network Services

Today's ever-growing, wide-range of network applications shift the performance requirements of the network for satisfying user's needs and expectations from high throughput to high media quality, fast interactivity, and prompt responsiveness. Therefore, from end users' perspectives, Quality of Service (QoS) is not the right way to capture the performance of computer networks, Internet provider services or similar services.

QoS focuses on measuring performance from a perspective of computer network administration. Typical QoS metrics in telecommunications and computer networks include data packet loss, data packet delay, jitter, available bandwidth, and similar metric. Quality of experience (QoE), on the other hand, deals with user expectation, satisfaction, and overall experience, and includes factors like the content, the application, the terminal, the cost and the performance of the computer network in the context of providing specific services. As such, QoE is application-dependent and is a subjective metric that involves several human dimensions; hence, compared to QoS, QoE is harder to quantify or objectively measure.

Providing high QoE to users of computer network applications is one of the most challenging tasks for network administrators and service providers. The difficulty of the task is governed by the limited resources of the computer network and the increasing and largely unknown demands from a large group of users and the large variety of applications used by this large group of users. Although it may not be difficult to measure a few individual dimensions of the QoE, especially those that overlap with QoS metrics, capturing users' overall perceptions when they are using different network applications is difficult, in particular, under real-world conditions where direct user feedback is not available.

While network administrators and service providers today have ways to support differentiated QoS, automated methods to translate QoS to QoE for general applications are still missing. The challenge for a network administrator or service provider is to have the right set of tools and processes to map QoS at the network level to QoE at the user level and have the ability to control it. This is mainly because of two reasons. First, the requirements of many network applications go beyond the traditional single requirement of high throughput and include high media quality, fast interactivity, and prompt responsiveness. These requirements are not directly captured by typical QoS metrics. For example, the QoE requirements of Voice over IP (VoIP) conversations may include dimensions like sound fidelity, voice loudness, noise levels, echo levels, and conversational delay. In another example, the QoE requirements of on-line gaming could include dimensions like interactivity, responsiveness, and consistency.

Second, QoS guarantees in computer networks are not an end-to-end concept, and are only applied to parts of the path between the source of a resource and a user computing system. In other words, there is no coordination between all packet-processing devices connecting a client to a server. Therefore, QoS measurements in individual nodes or sub-networks may indicate acceptable performance, but end users may still be experiencing unacceptable performance. A VoIP subscriber, for example, may experience service interruptions because of packet drops by a single switch at the edge of the network—even though all other routers/switches implement the required QoS prioritization. Another challenge in QoS to QoE translation is the coarse aggregation-level at which QoS classification is typically applied. A guaranteed QoS for a class of data does not necessarily mean a guaranteed per-flow performance.

Methods for assessing the quality of network applications can be classified as either subjective or objective. Subjective methods require users' input in the evaluation process. Objective methods do not require such input, but they are often based on well-validated data derived from subjective evaluations. The traditional approach to QoE measurement is subjective quality evaluations in which users indicate their feelings in a survey. These evaluations typically involve direct feedback from the users by completion of surveys or direct monitoring of their activity.

Objective evaluations rely on monitoring the behaviour of an application and/or a user by using measurements on the network-level or on the media-level measurements as input for quality assessments. We group the related work on objective measurement into the active measurement based and passive measurement based categories. Active measurements mean the injection of extra data to perform the measurement, such as audio and/or video sequences. Examples of audio assessment models include perceptual speech quality measure (PSQM) and its successor perceptual evaluation of speech quality (PESQ), the measuring normalizing blocks (MNB), and the modified bark spectral distortion (MBSD) and the enhanced version (EMBSD). In the case of video, some of the developed tools are the Structural Similarity Index Measurement (SSIM) and the Video Quality Measurement (VQM).

Measuring QoE using a passive method is less intrusive. The idea is to conceive a model which maps a QoE relevant set of these parameters to a quality value. For example, a model could be based on a rigorous analysis of call durations and source- and network-level QoS metrics in determining a QoE for VoIP. However, few such passive methods have been developed that can serve as tools for managing QoE for network administrators and service providers.

The embodiments of the invention provide a method and system for avoiding the disadvantages of the prior art. A major problem with subjective methodologies is that they cannot easily be automated, but require a group of people to conduct the tests and evaluate the results. This makes subjective methods expensive and time consuming.

In addition, the reliability of the results of these subjective methodologies can be questioned since human judgment may be impacted by various factors like momentary inducements, personal biases and limitations of human memory. With respect to the former, ratings may, for instance, be related to how interesting the content is, the remunerations given for participating in a test and similar issues. With respect to the latter, when a tester is asked to watch a 10-minute long video, there is no guarantee that the signal in the first 2 minutes and the signal on the last 2 minutes would have identical impacts on the subject. Moreover, given the nature of human memories, people are subject to the recent effect. In other words, the most recent experience dominates a user's ratings.

In subjective methodologies the metric used to quantify experiences is not quite scientific. In general the subjects are asked to give absolute ratings for each test. However, different people may have different interpretation of the absolute values. For instance, there could be a scale of 1-5 of predefined scores mapping to the experiences of bad, poor, fair, good, and excellent experiences respectively. Different people may have different interpretations of these feelings hence the results may differ between people who have the same experience.

A large population of testers is required as one subject cannot take the same test repeatedly too many times. Otherwise, the subject may become tired and insensitive so to give biased scores. Moreover, one typically needs to run many different tests with, for example, different content in each test.

Objective evaluation methods are more efficient than subjective test, because no user input is required. However, they are typically designed for specific applications, mostly audio and video and they have a strong dependence on subjective tests results for calibration or training and many approaches are based on the availability of an undisturbed reference signal. Moreover, they assume that individual quality features such as loudness, delay, echo, and distortion have mutually independent effects on the perceived quality and this is typically not the case. Further, the limitations of existing passive inference approaches are that they are mainly focused on specific applications or services and cannot be directly applied to general applications.

The embodiments of the invention overcome these disadvantages of the the prior art. The embodiments encompass an automated QoE inference engine based on passive observations of data traffic in the network. Specifically, the embodiments set forth a method and system whereby from a stream of packets correlated data flows related to a loading of web page can be monitored to determine prematurely terminated page loads that indicate an unsatisfactory user experience and can be used to generate a QoE metric that represents this aspect of the user experience, where a user has caused the termination of a load of a web page prior to completion of the loading of that web page. Such a premature termination of the loading of a web page indicates that the loading of the page was taking too long, was not sufficiently responsive or was otherwise unsatisfactory.

A systematic and automatic QoE inference engine can be used in traffic management to set targets for QoS, possibly differentiated by subscription class or content provider, and to support these targets by means of traffic prioritization in schedulers and similar actions. The QoE inference tool can also be used in customer management to reduce churn rates by identifying dissatisfied users and suggesting other subscription classes or offering increased caps on data volumes.

In the embodiments of the QoE inference engine presented herein, QoE is determined for transaction-based web applications by an automated QoE inference engine based on traffic observations. The QoE inference engine operates by passive QoE inference. The process implemented by the QoE engine seeks indicators of user perceived performance degradation by passively monitoring certain traffic characteristics. The process is generic and thus applies to a diverse set of applications although the examples provided herein below are focused on the example of web browsing for sake of convenience and clarity. The embodiments of the invention also include the application of this inference engine to set targets (typically an offline process) and to support targets (typically an online process). One skilled in the art would also understand that the principles and structures described herein can also be applied to other web based applications, servers and resources.

QoE Metrics

An unsatisfactorily long time from the request for a page to the presentation of that page on the screen could make impatient end-users push the STOP or RELOAD buttons in their web browsers thereby initiating user-end cancellations. Such cancellations would result in early closures of the HTTP sessions as well as the underlying TCP connections and may be interpreted as indicators of unsatisfactory QoE. These closures or similar 'premature terminations,' can be identified by analysing the HTTP protocol transactions and the transport layer actions. Other examples of actions that can cause premature terminations include the use of FORWARD or BACKWARD buttons, entry of a new URL, or selection of a new link in a page in a browser or tab of a browser before the completion of a page load. The embodiments search for these indicators of QoE degradation in the data traffic.

The process and system of the QoE inference engine identify unsatisfactory user experiences by searching for patterns from passively collected packet traces although process can also be applied to live traffic. The assumption is that when a user experiences bad performance, he or she will initiate the closure as a premature termination of the HTTP session instead of waiting for the normal HTTP downloading process to (possibly) finish and the communication pattern observed in the network will thus be different from the one during normal downloading cases. The process searches for such patterns from the network's perspective. Note that the process thus has a significant difference from other possible approaches to this problem.

The set of indicators that can be explored from passive measurement have been verified through control experiments, i.e. using TCPDUMP to capture the packet trace during web browsing. It has been thereby verified by monitoring that the below observations hold for several popular browsers including Internet Explorer (IE) by Microsoft Corp. of Redmond, Wash., Firefox and Chrome by Google, Inc. of Mountain View, Calif., with HTTP/1.1 and without pipelining enabled. However, these observations would hold for other web browsers and HTTP implementations. The observed communication pattern is shown in FIG. 1.

Scenario 1: Client Action:
Open a web page, before is completely loaded, click the "STOP" button on the browser.
Communication Pattern:
The client sends a TCP reset packets, [RST, ACK], to close the TCP connection. It then keeps on replying with [RST] packet when receiving additional data packets from the web server.

Scenario 2: Client Action:
Open a web page, before it is fully loaded, click "REFRESH" or "RELOAD."
Communication Pattern:
The client closes the previous TCP session. For any additional packets destined to the previous port, the host replies with [RST]. As soon as the user clicks REFRESH or RELOAD, the host begins a new TCP session and sends new requests, i.e. HTTP GET, to the web server again.

Scenario 3: Client Action:
Open a web page, before it is fully loaded, click "BACKWARD" ("Back") or "FORWARD," or open a completely different page in the current window or tab.
Communication Pattern:
Very similar to the "REFRESH" action above. All existing sessions for the current page are closed and [RST] packets are sent. New TCP sessions and new requests are sent out again for the previous page.

In one embodiment, other metrics are detected and the QoE metrics can be stored long term along with other statistics for use in future or long term analysis related to QoE. For example, even if the download of a page X progresses at normal rate or even at an above average rate, the user may still interrupt because, e.g., the page was requested by mistake. By comparing the rate of a data flow to what a user typically tends to accept one can, to some extent, discriminate between RST and other premature terminations that are because of poor QoE and premature terminations that are for other reasons. If a user has seen page X one or more times before, this is an even stronger indication that it was the content rather than the QoE that prompted the premature termination. Thus, having a history of the premature terminations and the associated data can enable more nuanced analysis.

Overall Process

Figure 2:
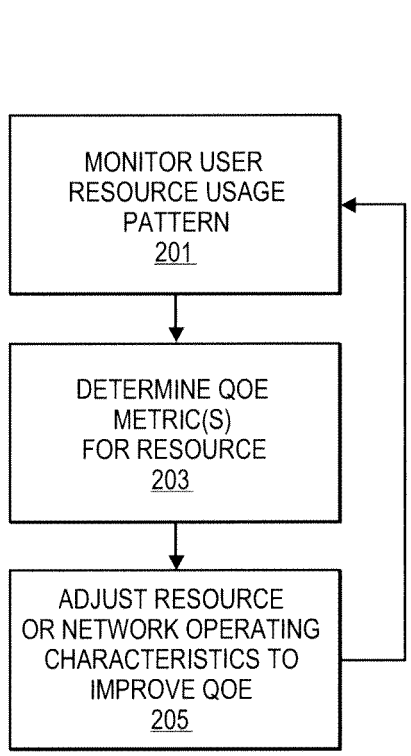
FIG. 2 is a flowchart of one embodiment of an overview of the passive QoE monitoring process.

The overall process of the embodiments of the invention is shown in FIG. 2. The process monitors user resource usage patterns (Block 201). The user resource usage pattern is utilized to determine QoE metrics for the resource (Block 203). The QoE metrics are then used to adjust resource or network operating characteristics to improve QoE or alternatively used to suggest services that would provide the desired QoE.

Figure 3:
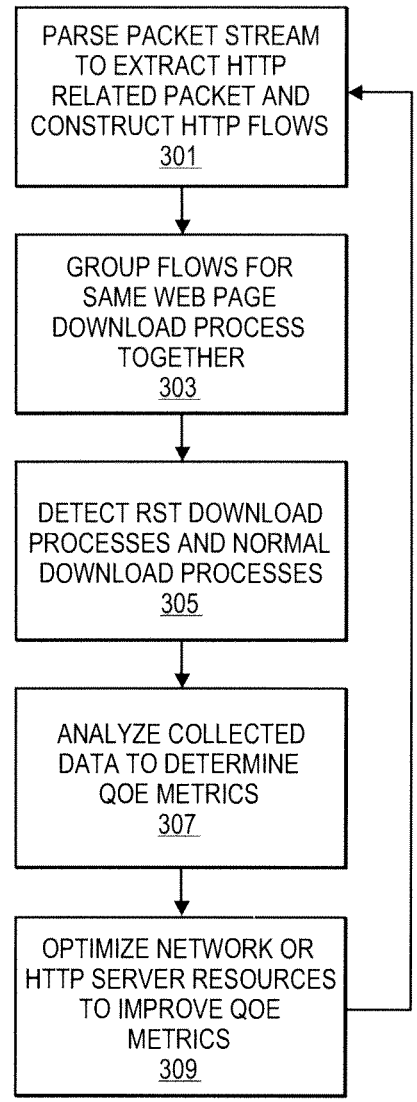
FIG. 3 is a diagram of one embodiment of the passive QoE monitoring process applied to web page browsing.

FIG. 3 is a diagram of one embodiment of the process as applied to web page browsing or similar web based resource access. The process starts by parsing the packet stream or a packet trace, which is a collected and stored set of data packets, and extracts the hyper-text transfer protocol (HTTP) related packets to construct HTTP flows (Block 301). Then the flows are grouped such that flows belonging to the same web page download process are grouped together (Block 303). Each web page download process is then classified as a normal download or a download with a premature termination such as a resent or RST (Block 305). Finally, various offline or real-time analyses of the data can be conducted to determine QoE metrics or used to apply online control based on the current state (Block 307). These QoE metrics can then ultimately be used to optimize network or HTTP server resources to improve the QoE metrics (Block 309). This process is described in greater detail herein below.

Process to Detect User Dissatisfaction from Passive Measurement (1) Grouping Flows in a Page Download Process From a stream of packets (or a recorded packet trace), the HTTP page downloading processes are extracted. Sophisticated web pages today often contain many static and dynamic objects. In a page loading process, a browser typically first downloads a main hyper-text mark-up language (HTML) object that defines the structure of the page, followed by a Cascading Style Sheet (CSS) object that describes the presentation of the page. The main HTML object can embed many Java script objects that are executed on the local machine. As the page is being rendered, additional objects may be requested, such as images and Java scripts. This process continues until all relevant objects are received and rendered. In HTTP/1.1, a browser uses persistent transmission control protocol (TCP) connections which can be used for multiple HTTP requests and replies to the same destination. The browser generally keeps the number of concurrent flows small. It opens a new TCP connection only when all the existing connections are occupied by other requests or replies.

To identify pages, the process thus first parses the packet payload to obtain HTTP protocol related information, such as the URL, agent, objects, response code and the content of the HTML page. The process then identifies embedded objects by searching the HTML code of a page and builds a list of all objects embedded in that page. The process then searches for such objects in the subsequent flows and, once a match is found, the corresponding flow is grouped together with the page in question. An example pseudo-code representation of the process is shown in Table I.

However, in some cases, the requests are dynamically generated by executing Java scripts locally or the HTTP pages are encrypted. To handle these scenarios, a heuristic to group flows together can be employed as follows. If two flows are sent from the same source (e.g., from a user device) to the same destination (e.g., the HTTP server), with either the same or different source ports, and within a short time interval, then it is very likely that they belong to the same page. Different threshold values have been tested for the time interval and it has been found that the results are not sensitive to the exact choice (i.e., the $THRES_f$ in line 6 in Table I). In one embodiment, 0.5 seconds was used.

TABLE I

Process for Detecting QoE Indicators

```
procedure Detect_Metrics(p)
 1: If tcp_port(p) ≠ HTTP _PORT then
 2:     next;
 3: end if
 4: for every active session s_i ∈ Set_Active_Session ( ) do
 5:     if flow(p) = flow(s_i) then
 6:         if timestamp(p)-timestamp(last packet in s_i)< THRES_f then
 7:             group p to s_i
 8:             last;
 9:         end if
10:     else
11:         if address(p)=address(s_i) then
12:             if object(p) ∈ embedded_content_set(s_i) then
13:                 group p to s_i
14:                 last;
15:             end if
16:         end if
17:     end if
18. end for
19: if tcp_flag(p)&RST == 1 then
20:     if session(p) is not completed then
21:         classify session(p) as RST download
22:     end if
23: end if
```

(2) Detecting Normal and Prematurely Terminated (RST) Downloads

Figure 4:
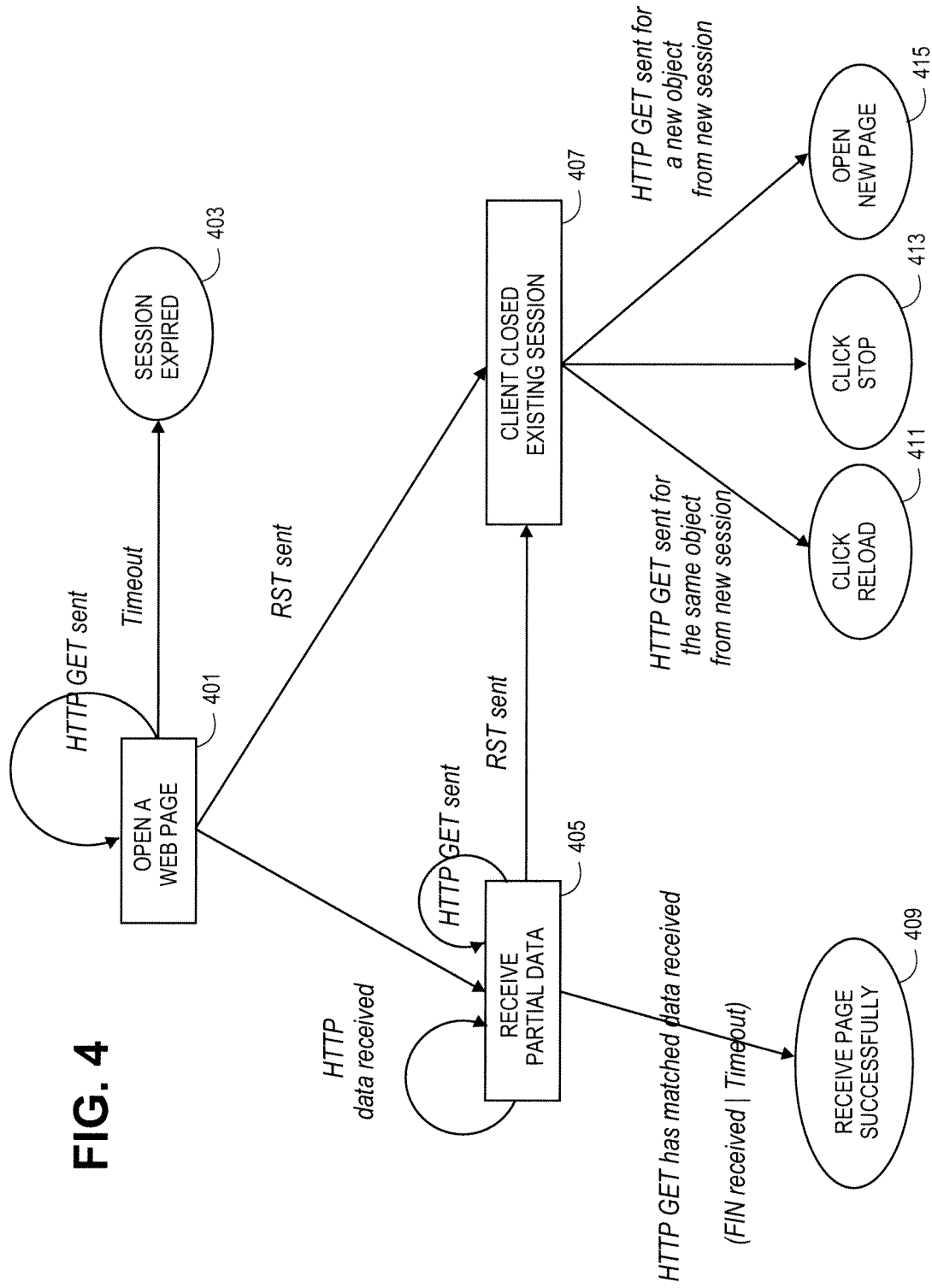
FIG. 4 is a diagram of one embodiment of a state machine for a download process for a web page.

To determine if a download terminates normally or with a premature termination such as an RST the process models the download process as a state machine shown in FIG. 4. Once the process detects a new request (HTTP GET) sent from a particular source (e.g., end user) to a destination (e.g., web server) which does not belong to any existing in-progress page, the process assumes that a new page begins and a new state machine is set up in its initial state 'Opening a new web page' (Block 401). Then the process continues parsing the subsequent flows between the same source/destination pair unless a timeout occurs in which case the session expires (Block 403). Upon observing more HTTP GETs sent from the client, it stays in the initial state. Upon receiving data from the server, the state changes to 'Receive partial data' (Block 405). In this state, it is assumed that the client has received some of the content from the web page, but not the complete page. This state continues until each HTTP GET has received all data. This is estimated by matching the source port of the HTTP GET with the destination port of the HTTP data packets. Once this condition is satisfied, the process checks whether the TCP connection ends with a TCP FIN packet, or a TCP RST packet, or a TCP connection timeout.

From the network's perspective, it is hard to determine whether all content has been received for a web page. Instead, the process infers this based on the user's behaviour. When TCP FIN packets are received or the maximum timeout threshold is reached, the process considers the page to be loaded successfully (Block 409) and otherwise the process assumes that the user has initiated a premature termination of the download. For this case, the process further categorizes the user's actions into three sub-classes by continuing to monitor the subsequent flows. If the same source sends a request for the same URL and the same object in a new session, then we infer that the user has clicked "REFRESH" or "RELOAD" to terminate the last session (Block 411). If a new object is requested, then the process infers that the user has opened a new web site or moved forward/backward (Block 415). Finally, if there is no new request sent from the source, then we infer that the user has clicked "STOP" in the web browser (Block 413).

In other embodiments, it is possible to see if a normal completion will occur before a page is completely downloaded even if a FIN is sent instead of an RST. This can be done by inspecting the size of the document being downloaded (typically reported in the first HTTP response message from the server) and then successively counting the bytes downloaded. If a FIN appears before the count has reached the announced size it is an indication of a premature termination. Other variants can similarly replace or complement the detection of RST for determine premature termination.

Figure 5:
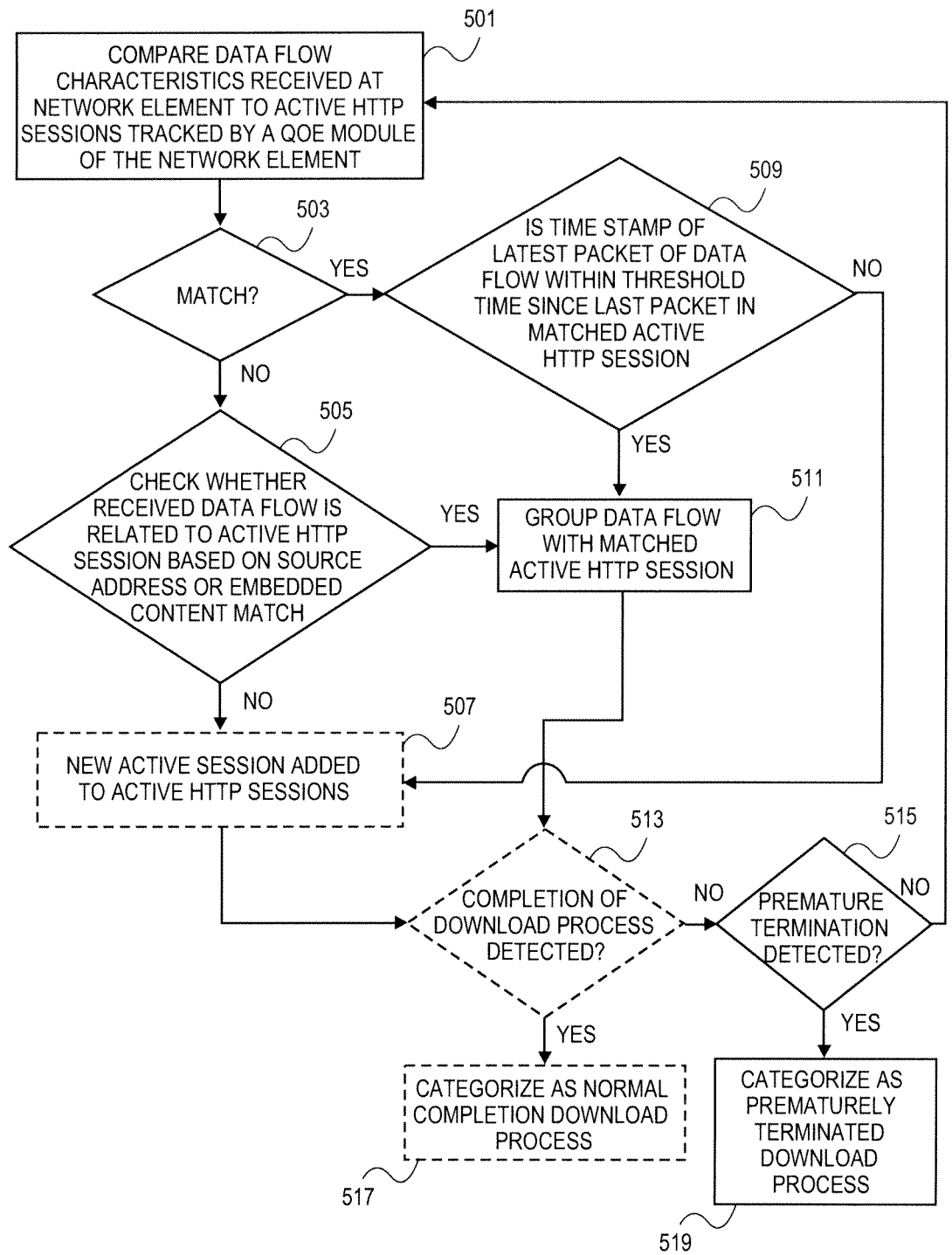
FIG. 5 is a flowchart of one example embodiment of the passive web resource monitoring process.

FIG. 5 is a flowchart of one example embodiment of the passive web resource monitoring process. In one embodiment, the process works on real-time data packets. In other embodiments, the data that is processed is from stored packet traces. The process compares data flow characteristics received at a network element to active HTTP sessions that are tracked by a QoE module of the network element (Block 501). A check is made to determine whether there is a match of the data flow characteristics (e.g., source address, destination address, or similar information) (Block 503).

If a match is found with an existing active HTTP session, then a check is made as to whether the time stamp of the latest packet of data from the data flow within a pre-defined threshold of time since the last packet in the matched active HTTP session (Block 509). This ensures that the active HTTP session is still valid and available for grouping.

If a match of the characteristics of the data flow and the active HTTP sessions is not found (Block 505), then a check is made as to whether the received data flow is related to an active HTTP session based on source address or embedded content matching (Block 505). If either check is successful, then the received data flow is grouped with the matching active HTTP session (Block 511). However, if no match was found then a new active HTTP session can be added to the active HTTP session being tracked (Block 507).

A check is continually made as to whether the download process associated with an active HTTP session has completed (Block 513). The download process completes when the requested data associated with the active HTTP session is received or when all requested data associated with all grouped data flows has been received. The active HTTP session can then be removed from the set of active HTTP sessions being tracked. In addition, the HTTP session can then be categorized as having had a normal completion for the associated download process (Block 517).

If the active HTTP session and its associated download process (encompassing all related active HTTP sessions) have not completed then a check is made whether an RST or similar premature termination has occurred (Block 515). If no premature termination is detected, then the process continues to process received data flows or stored data flow traces (Block 501). If a premature termination is detected then the associated download process is categorized as a prematurely terminated download process, an RST download process or is similarly categorized (Block 519).

Figure 6:
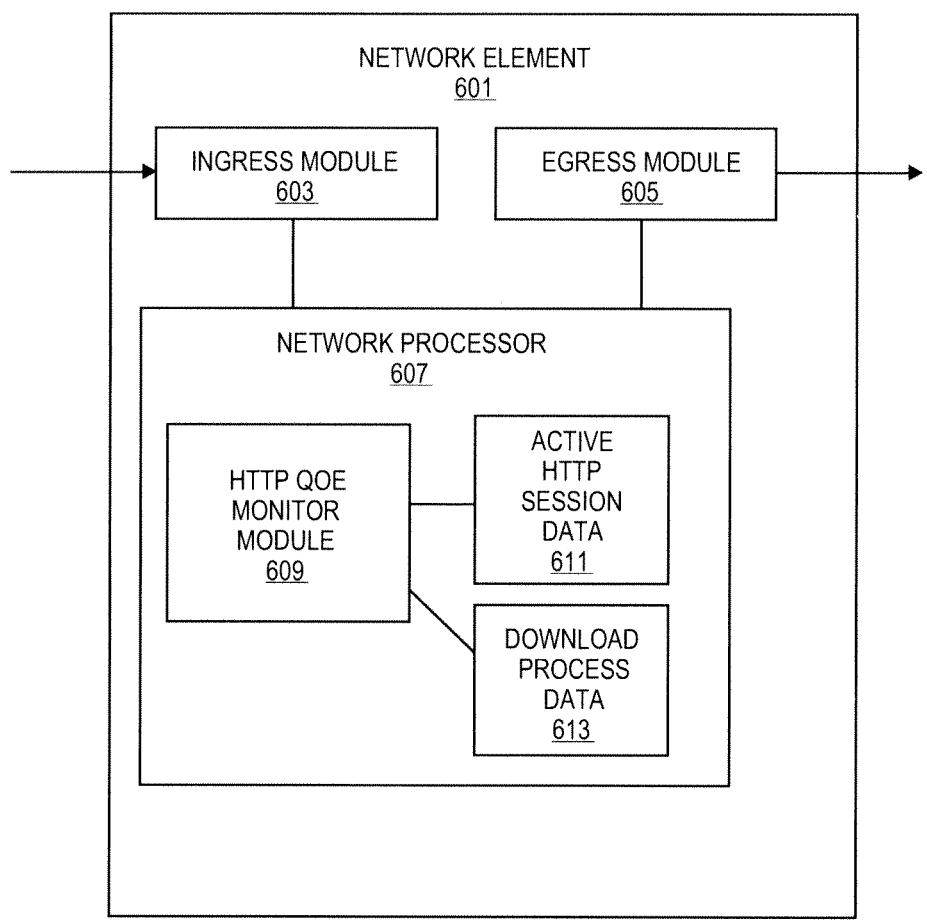
FIG. 6 is a diagram of one embodiment of a network element implementing the QoE inference engine and the passive QoE monitoring process.

FIG. 6 is a diagram of one embodiment of a network element implementing the QoE inference engine and the passive QoE monitoring process. In one example embodiment, the QoE inference engine is implemented as an HTTP QoE monitor module 609 that utilizes or manages active HTTP session data 611 and download process data 613. The network element 601 can be any type of network device including a switch, router or similar networking device. The network element 601 can be positioned in any location within a network such that data traffic to be monitored traverses the network element. In another embodiment, the network traffic to be monitored is collected at the network element, but analysed at another computing device. For sake of clarity the embodiments described herein collect the data traffic and analyse the data at the same network element 601.

The network element 601 can include an ingress module 603 and an egress module 605. The ingress module 601 and egress module 605 can manage the incoming and outgoing data traffic of the network element 601, respectively. The ingress module 603 and the egress module 605 can process the data traffic at the physical and/or transport levels of the OSI model, whereas the network processor 607 can receive the data traffic from the ingress module 603 and process the network and higher levels of the data traffic.

The network processor 607 can be any type of processing device including general purpose processing units and network element specific processing units or any combination thereof. The network processor 607 can execute an HTTP QoE monitor module 609 that implements the processing of the received data traffic as described above in reference to FIG. 5 or similarly implements the QoE inference engine. The HTTP QoE monitor module processes received data flows or collects data traces of the data flows that traverse the network element 601. In another embodiment, the collection and analysis of this data traffic is performed at another computing device separate from the network element or is performed as part of a distributed process.

The HTTP QoE monitor module can track each active HTTP session that traverses the network element 601 and store the active HTTP session information with the active HTTP session data 611. The active HTTP session data 611 can be stored in a dedicated storage device or in any general purpose memory or storage device. The active HTTP session data 611 that is stored can include any information about the active HTTP sessions being tracked including relations between or grouping information for active HTTP sessions, source and destination addresses, embedded content lists or objects, and similar information related to the active HTTP session being tracked and the resource being retrieved through the active HTTP session.

Similarly, download process data 613 can be stored together with or separately from the active HTTP session data 611 in any type of memory or data storage device. Download process data 613 can include data related to the grouping of active HTTP sessions for a download of a web page or similar web based resource. The download process data can include status of the download process completion as either a normal completion or a premature termination. This completion data can then be analysed as a QoE metric by QoE tools and similar applications.

Figure 7:
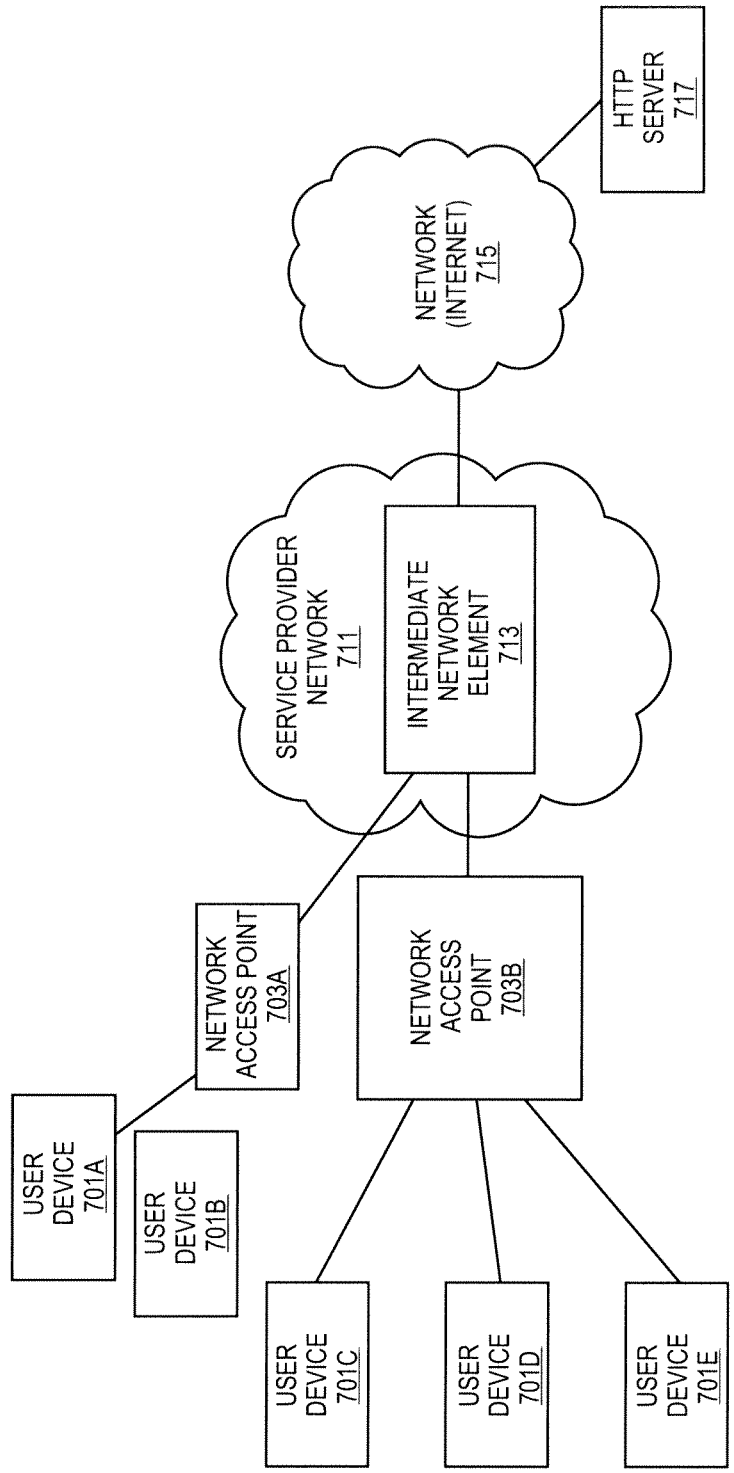
FIG. 7 is a diagram of one embodiment of a network in which the QoE monitoring process and system can be implemented.

FIG. 7 is a diagram of one embodiment of a network in which the QoE monitoring process and system can be implemented. The network includes a set of user devices 701A-E that access a web page or similar web-based resource from a server 717 such as an HTTP server. The user devices 701A-E can execute any type of application that may access the web resource such as a browser that accesses web pages and related data from an HTTP server 717, a proxy cache or similar source.

The user devices can connect to the server 717 by connections to network access points 703A, B. The network access points 703A, B can be any type of network access point that provides network access to user devices. The user devices 701A-E can be computer systems including desktop computers, handheld computing devices, console devices or similar computing devices that access web based resources. The network access points 703A, B can be any routers, switches, bridges, wireless access points or similar devices. The network access points 703A, B connect to a service provider network 711 or directly to a wide area network such as the Internet 715 to provide communication between the user device 701A-E and the server 717.

In one embodiment, an intermediate network element 713 in the service provider network 711 or anywhere along the path of communication between the user devices 701A-E and the server 717 implements the passive QoE monitoring process and the QoE HTTP monitoring module described herein above. In one embodiment, the intermediate network element 713 collects and analyses the data flows to generate QoE metrics. In other embodiments, the intermediate network element 713 collects the data flow traces to be processed at another computing device in communication with the intermediate network element 713 where the QoE metric data is generated.

QoE Analysis

Figure 8:
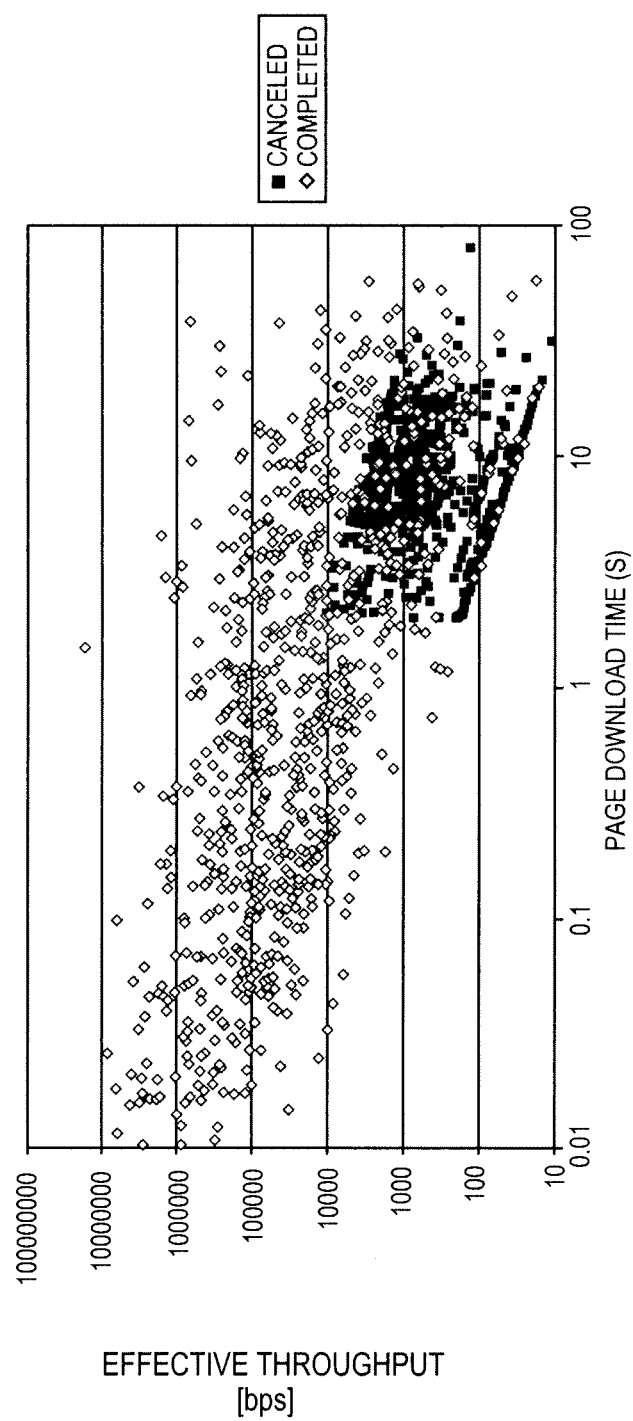
FIGS. 8-11 are diagrams of QoE related statistics.

Understanding user satisfaction is essential for the development of QoS-sensitive applications and for network administrators and service providers to avoid expensive complaints and to reduce customer turnover (i.e., churn). The process and system described herein above provides an automated detection of user satisfaction degradation for web services. The process and system identify a set of characteristics from live or recorded data traffic that are related to the user perceived experience. The creditability of the classification of download processes as premature terminated (i.e., 'cancelled') or completed is illustrated in FIG. 8, which shows the page download time and effective throughput for 1000 interrupted downloads (black/solid) and 1000 normal downloads (white/hollow). It is clearly seen that interrupted downloads occur in the "bad corner" of long page download time and poor effective throughput.

Figure 9:
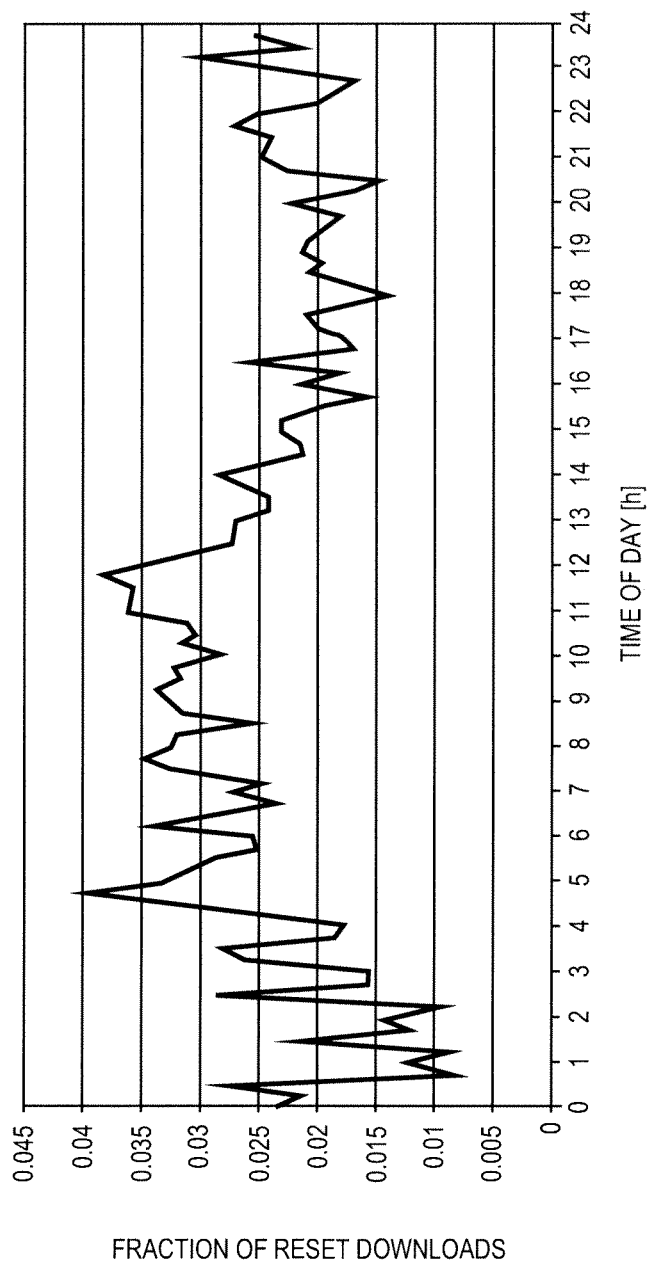
Figure 10:
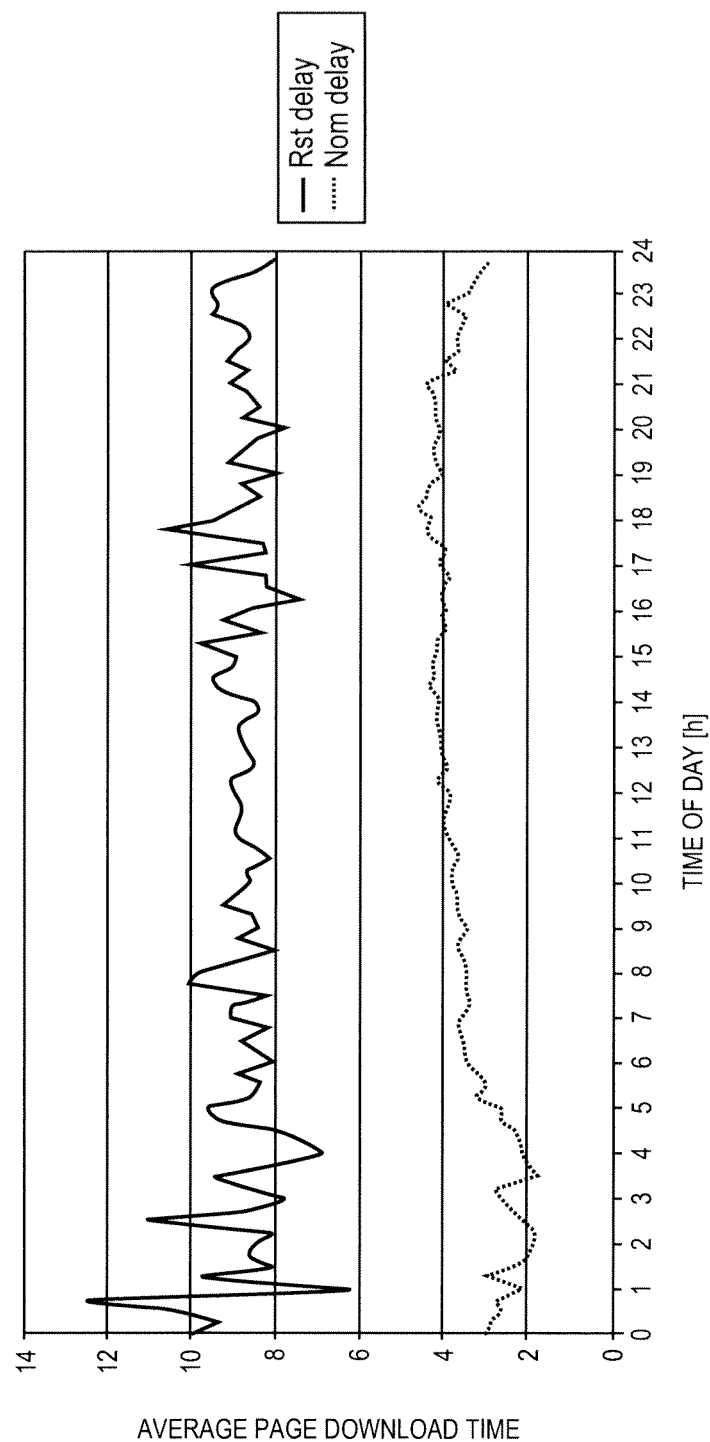

The passive QoE monitoring process does not require active involvement of users and no active measurements are injected into the network. The process and system can be used to establish a mathematical model to capture the relationship between QoS and QoE. With the data collected by the passive QoE monitoring process and system, a deeper understanding of expectations on the network service performance can be developed and how different factors affect user experiences with the system can be determined. Such information can be used to configure optimal policies from the network administrator or service providers' perspectives. For example, the network service provider can provide different subscription schemes for groups of users or time periods with different patience and tolerance levels. As an example, the data in FIG. 9 shows that user tolerance varies over time and in FIG. 10 that this variation cannot be completely explained by page download times. To see this, note that the fraction of reset downloads peaks between 5 am and noon whereas page response times peak between 5 am and 11 pm.

Figure 11:
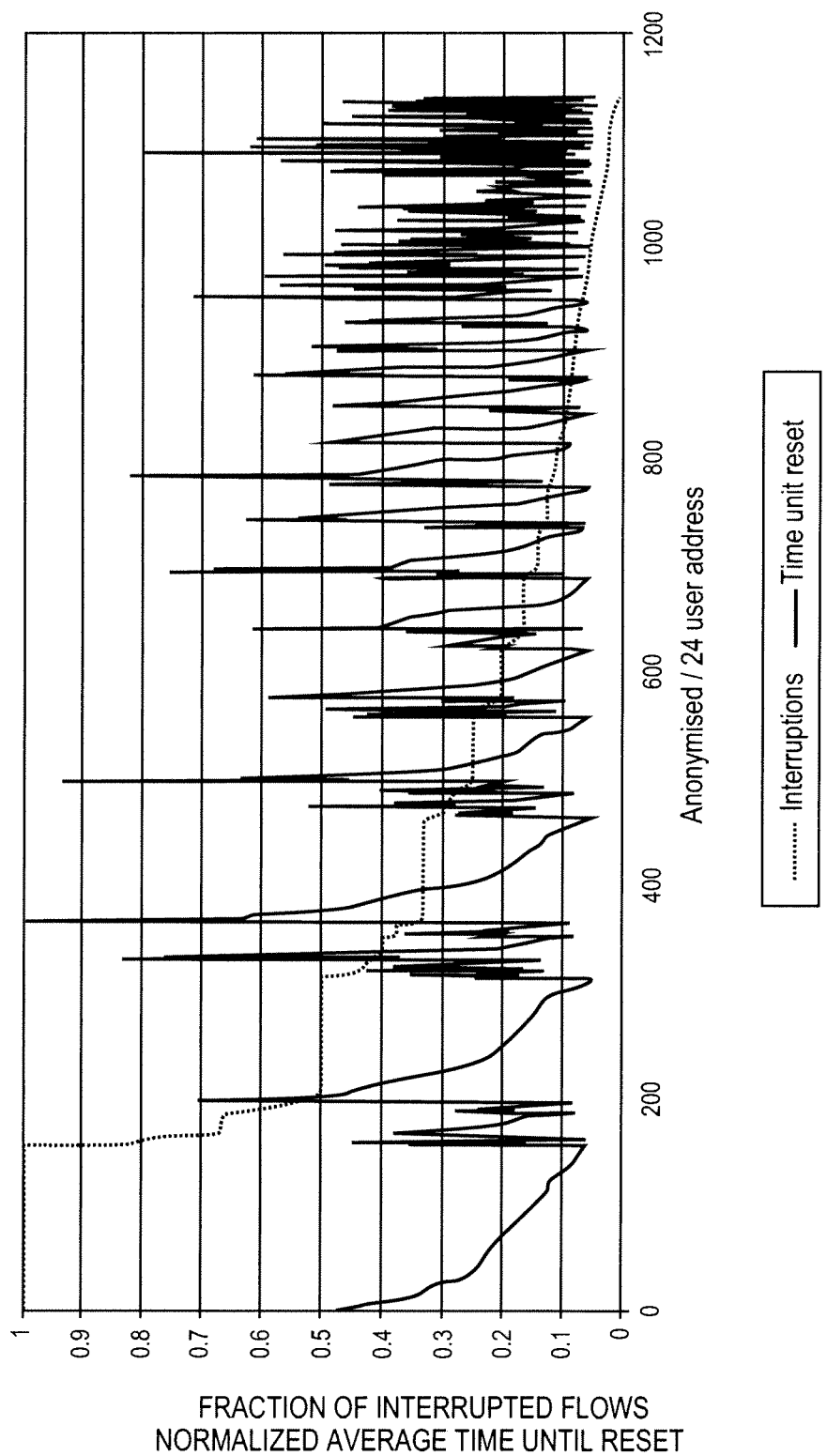

The results from the passive QoE monitoring process and system can also be used in data traffic management (to set targets for QoS, possibly differentiated by, e.g., subscription class or content provider, and to support to these targets by, e.g., real time scheduling) as well as customer management (to reduce churn rates by identifying dissatisfied users and, e.g., suggest other subscription classes or offer increased caps on data volumes). The process and system can be deployed in both wired and wireless networks, for a diverse set of applications. As an example, we show in FIG. 11 that the fraction of reset flows varies between users ("cancellation rate", dotted line curve) and that these variations cannot be completely explained by variations in time until reset ("patience", solid line). To see this, note that the shapes of the two curves are quite different.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a network element to generate quality of experience (QoE) metrics for hypertext transfer protocol (HTTP) sessions over a network between a user device and an HTTP server, the QoE metrics based on detecting premature termination of a download process that indicate low QoE, the method comprising the steps of:
comparing characteristics of a data flow received at the network element with active HTTP sessions tracked by a QoE module of the network element;
in response to a match of the received data flow with a matched active HTTP session, checking whether a time stamp of a latest packet of the received data flow is within a threshold time since a last packet in the matched active HTTP session;
in response to not finding a match of the received data flow in the active HTTP sessions, checking whether the received data flow is related to one of the active HTTP sessions based on an address of the user device or embedded content identifier of the received data flow;
grouping the received data flow with the matched active HTTP session or a related active HTTP session;
checking whether a premature termination has occurred prior to normal completion for the matched active HTTP session or the related HTTP session; and
in response to detecting that the premature termination occurred, categorizing a download process linked to the matched active HTTP session or the related HTTP session as a prematurely terminated download process.

2. The method of claim 1 further comprising the step of:
adding the received data flow as a new active HTTP session tracked by the QoE module in response to not finding a match or related active HTTP session.

3. The method of claim 1, further comprising the step of:
checking whether a download process linked to the data flow has a normal completion.

4. The method of claim 3, further comprising the step of:
categorizing the download process linked to the received data flow as normal in response to the normal completion of the active HTTP session associated with the received data flow.

5. The method of claim 1, further comprising the step of:
maintaining a state of each of the active HTTP sessions.

6. The method of claim 1, further comprising the step of:
determining a normal completion of the download process when data in the received data flow matches data requested for the download process and a finish message has been received or a timeout has occurred for the active HTTP session associated with the download process.

7. The method of claim 1, further comprising the step of:
storing a categorization of the download process as a QoE metric.

8. The method of claim 7, further comprising the step of:
correlating the QoE metric with other QoE metrics for the user device or HTTP server.

9. The method of claim 1, further comprising the step of:
adjusting operating characteristics of the network to improve the QoE metric.

10. The method of claim 1, further comprising the step of:
adjusting operating characteristics related to the HTTP server to improve the QoE metric.

11. A network element configured to execute a set of processes to generate quality of experience (QoE) metrics for hypertext transfer protocol (HTTP) sessions over a network between a user device and an HTTP server, the QoE metrics based on detecting prematurely terminated download processes that indicate low QoE, the network element comprising:
an ingress module to receive a data flow between the user device and the HTTP server;
an egress module to transmit the data flow between the user device and the HTTP server; and
a network processor to execute a QoE monitor module and to maintain an active HTTP session data store and a download process data store,
the active HTTP session data store to store HTTP session state for each active HTTP session traversing the network element,
the download process data store to store download process state for each download session traversing the network element, wherein each download process can include a set of related active HTTP sessions,
the QoE monitor module to compare characteristics of the data flow with active HTTP sessions tracked by the QoE monitor module in the active HTTP session data store, the QoE monitor module to check, in response to a match of the received data flow with a matched active HTTP session, whether a time stamp of a latest packet of the received data flow is within a threshold time since a last packet in the matched active HTTP session, the QoE monitor module to check whether the received data flow is related to one of the active HTTP sessions based on an address a an address of the user device or embedded content identifier of the received data flow in response to not finding a match of the received data flow in the active HTTP sessions, the QoE monitor module to group the received data flow with the matched active HTTP session or a related active HTTP session, the QoE monitor module to check whether a premature termination has occurred prior to normal completion for the matched active HTTP session or the related HTTP session, and in response to detecting that the premature termination occurred, categorizing a download process linked to the matched active HTTP session or the related HTTP session as a prematurely terminated download process.

12. The network element of claim 11, wherein the QoE monitor module adds the received data flow as a new active HTTP session to the active HTTP session data store in response to not finding a matched active HTTP session or related active HTTP session.

13. The network element of claim 11, wherein the QoE monitor module checks whether a download process linked to the received data flow has a normal completion.

14. The network element of claim 11, wherein the QoE monitor module categorizes the download process linked to the received data flow as normal in response to the normal completion of the active HTTP session associated with the received data flow.

15. The network element of claim 11, wherein the QoE monitor module maintains a state of each of the active HTTP sessions in the active HTTP session data store.

16. The network element of claim 11, wherein the QoE monitor module determines a normal completion of the download process when data in the received data flow matches data requested for the download process and a finish message has been received at the network element or a timeout has occurred for the active HTTP session associated with the download process.

17. The network element of claim 11, wherein the QoE monitor module to store a categorization of the download process as a QoE metric in the download process data store.

18. The network element of claim 17, wherein the QoE monitor module correlates the QoE metric with other QoE metrics for the user device or HTTP server.

19. The network element of claim 11, wherein the QoE monitor module adjusts operating characteristics of the network to improve the QoE metric.

20. The network element of claim 11, wherein the QoE monitor module adjusts operating characteristics related to the HTTP server to improve the QoE metric.

* * * * *

UNITED STATES PATENT AND TRADEMARK OFFICE
CERTIFICATE OF CORRECTION

| | | |
|---|---|---|
| PATENT NO. | : 8,972,568 B2 | Page 1 of 1 |
| APPLICATION NO. | : 13/401645 | |
| DATED | : March 3, 2015 | |
| INVENTOR(S) | : Arvidsson et al. | |

It is certified that error appears in the above-identified patent and that said Letters Patent is hereby corrected as shown below:

On Title Page 2, item (56), under "OTHER PUBLICATIONS" in Column 1, Line 16, delete "disroerions" and insert -- distortions --, therefor.

In the specification

In Column 10, Line 23, delete "flow" and insert -- flow is --, therefor.

In the claims

In Column 14, Line 35, in Claim 11, delete "address a an address" and insert -- address --, therefor.

Signed and Sealed this
Seventh Day of June, 2016

Michelle K. Lee
*Director of the United States Patent and Trademark Office*